(12) United States Patent
Eguchi et al.

(10) Patent No.: US 12,736,861 B2
(45) Date of Patent: Sep. 15, 2026

(54) WORK INFORMATION PROJECTION SYSTEM AND RELATIVE INFORMATION CALIBRATION METHOD

(71) Applicant: KAWASAKI JUKOGYO KABUSHIKI KAISHA, Hyogo (JP)

(72) Inventors: Masahiro Eguchi, Kobe (JP); Taiki Okada, Kobe (JP); Atsuki Nakagawa, Kobe (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 446 days.

(21) Appl. No.: 18/280,947

(22) PCT Filed: Mar. 10, 2021

(86) PCT No.: PCT/JP2021/009471

§ 371 (c)(1),
(2) Date: Feb. 14, 2024

(87) PCT Pub. No.: WO2022/190240

PCT Pub. Date: Sep. 15, 2022

(65) Prior Publication Data

US 2025/0284185 A1 Sep. 11, 2025

(51) Int. Cl.

*G03B 21/14* (2006.01)
*G03B 17/54* (2021.01)
*G03B 21/56* (2006.01)
*G03B 29/00* (2021.01)

(52) U.S. Cl.

CPC ........... *G03B 21/147* (2013.01); *G03B 17/54* (2013.01); *G03B 21/56* (2013.01); *G03B 29/00* (2013.01)

(58) Field of Classification Search

None
See application file for complete search history.

(56) References Cited

U.S. PATENT DOCUMENTS

| | | | | |
|---|---|---|---|---|
| 10,210,607 | B1 * | 2/2019 | Weinschenk | H04N 9/3194 |
| 2019/0110032 | A1 * | 4/2019 | Someya | H04N 9/3194 |

FOREIGN PATENT DOCUMENTS

| | | | | |
|---|---|---|---|---|
| FR | 2969319 A1 * | 6/2012 | | G03B 21/132 |
| JP | 2005-322055 A | 11/2005 | | |

OTHER PUBLICATIONS

International Search Report and Written Opinion mailed on Jun. 8, 2021, received for PCT Application PCT/JP2021/009471, filed on Mar. 10, 2021, 9 pages including English Translation.

* cited by examiner

*Primary Examiner* — Toan Ton
*Assistant Examiner* — Danell L Owens
(74) *Attorney, Agent, or Firm* — XSENSUS LLP

(57) ABSTRACT

A work information projection system (1) includes a projector (12), a camera (14), and a controller. The projector (12) projects an auxiliary image (101) onto a workplace. The camera (14) captures the workplace. During a work, the controller controls the projector (12) based on a position of the projector (12) to project the auxiliary image onto the workplace. During a calibration process of calibrating relative information, the camera (14) captures a calibration image projected by the projector (12) onto a calibration jig (32) through a reflector (15). The controller performs the calibration process of calibrating the relative information based on the calibration image captured by the camera (14).

20 Claims, 8 Drawing Sheets

FIG. 6

WORK INFORMATION PROJECTION SYSTEM AND RELATIVE INFORMATION CALIBRATION METHOD

CROSS-REFERENCE TO RELATED APPLICATION

The present application is based on PCT filing PCT/JP2021/009471, filed Mar. 10, 2021, the entire contents of which are incorporated herein by reference.

TECHNICAL FIELD

The present invention mainly relates to a technology for calibrating a positional relation between a camera and a projector in a work information projection system that projects an auxiliary image for assisting a work onto a workplace.

BACKGROUND ART

PTL 1 discloses an information presentation apparatus for work assistance that includes a projector, a camera, a display, and a processing controller. The projector projects a projection target onto a workplace. The camera captures a plane of projection of the projector. The display displays the image captured by the camera. When a worker selects a projection target on the display using a mouse or a keyboard, the processing controller performs a process such as hiding the projection target selected by the worker. In addition, PTL 1 discloses a process of adjusting a positional relation between the projector and the camera using the camera to capture an image projected by the projector.

PRIOR-ART DOCUMENTS

Patent Documents

PTL 1: Japanese Patent Application Publication No. 2005-322055.

SUMMARY OF THE INVENTION

Problems to be Solved by the Invention

In PTL 1, the camera is arranged at a place where it can capture an image projected by the projector. A position onto which the projector projects the image is, in other words, a position where the work is performed. Thus, at this position, the position and shape of objects change as the work progresses. Therefore, when estimating the position of the camera based on the image captured by the camera, changes in the position and shape of object is a disturbance. As a result, the accuracy of estimation of the position of the camera may decrease. However, as disclosed in PTL 1, in order to calibrate the positional relation between the camera and the projector, it is necessary that the camera captures the image projected by the projector.

The present invention is made in view of the situation described above, and its main purpose is to provide a system that appropriately calibrates the relative positions of a camera and a projector during a calibration process, wherein a disturbance in an image captured by the camera during a work is less likely to occur.

Means for Solving the Problems

The problem to be solved by the present invention is as described above. The means to solve this problem and the effects thereof will be described below.

A first aspect of the present invention provides a work information projection system with a configuration described below. That is, the work information projection system includes a projector, a camera, and a controller. The projector projects an auxiliary image that assists a work onto a workplace. The camera captures the workplace. The controller creates the auxiliary image and transmits it to the projector. During a calibration process of calibrating relative information that indicates a relative positional relation between the camera and the projector, the camera captures a calibration image projected by the projector onto a calibration jig through a reflector. The controller performs the calibration process of calibrating the relative information based on the calibration image captured by the camera.

A second aspect of the present invention provides a work information projection method as described below. That is, in the work image projection method, a position is estimated based on an image captured by a camera and an auxiliary image that assists a work is projected onto a workplace using a projector attached to move integrally with the camera. The work image projection method includes a calibration process of calibrating relative information that indicates a positional relation between the camera and the projector. In the calibration process, the projector projects a calibration image onto a calibration jig. In the calibration process, the camera captures the calibration image through a reflector. In the calibration process, the relative information is calibrated based on the calibration image captured by the camera.

By performing the calibration process using the reflector, it is possible to arrange the camera to face in a direction significantly different from a direction that the projector faces in. Therefore, for example, by capturing a position where no work is being performed, the accuracy of the detection of the position of the camera becomes high since a disturbance is less likely to occur in the image captured by the camera. As a result, the projector can project the auxiliary image at an accurate position.

Effects of the Invention

The present invention can provide a system that appropriately calibrates relative positions of a camera and a projector during a calibration process, wherein a disturbance in an image captured by the camera during a work is less likely to occur.

BRIEF DESCRIPTION OF THE DRAWINGS

FIG. 6 is a schematic drawing of a work information projection system according to a first modification.

EMBODIMENT FOR CARRYING OUT THE INVENTION

An embodiment of the present invention will be described below with reference to the drawings. First, with reference to FIG. 1 and FIG. 2, outlines of a work information projection system 1 and a work information projection method will be described below.

The work information projection system 1 of the present embodiment is arranged in a workplace. The workplace is a place where a work is performed, such as a factory, an office, or an institution. The work is something that a worker does to an object by hand, by using a tool, or by operating a machine, such as assembling parts, painting, cleaning, or transfer. In the present embodiment, the worker performs the work of attaching a part to a workpiece 31 arranged in a factory.

Figure 1:
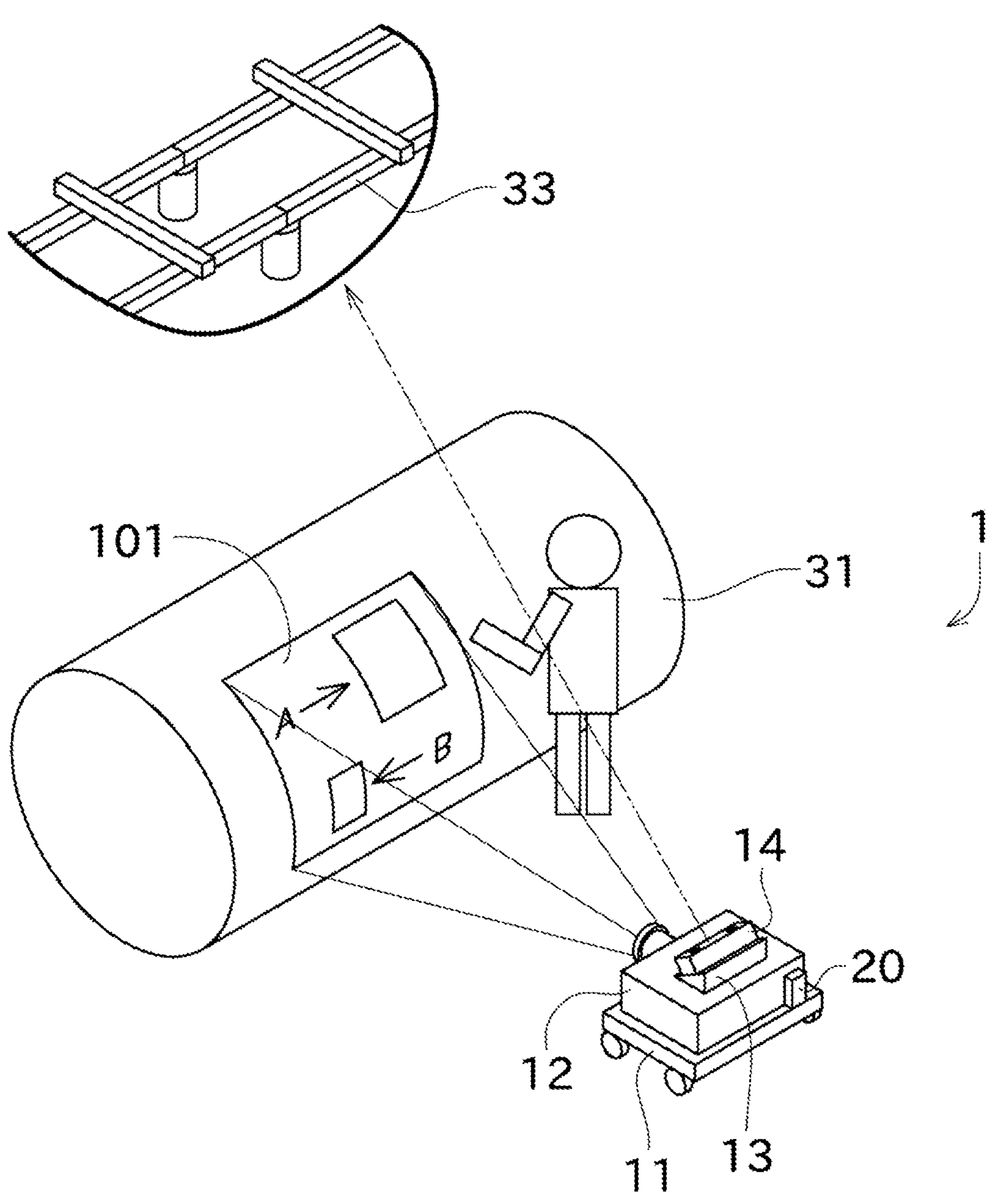
FIG. 1 is a schematic view of a work information projection system according to one embodiment of the present invention.

The work information projection system 1 projects an auxiliary image 101 onto the workplace. The auxiliary image 101 is an image that assists the work, such as an image that conveys content of the work, a position to perform the work, an order of the work, or the like to the worker. As shown in FIG. 1, the auxiliary image 101 of the present embodiment is projected onto the workpiece 31 and indicates names of parts to be attached and positions where to attach them. The work information projection system 1 recognizes the position of the workpiece 31 (details of this process will be described below) and projects the auxiliary image 101 onto the workpiece 31 at an appropriate position.

Figure 2:
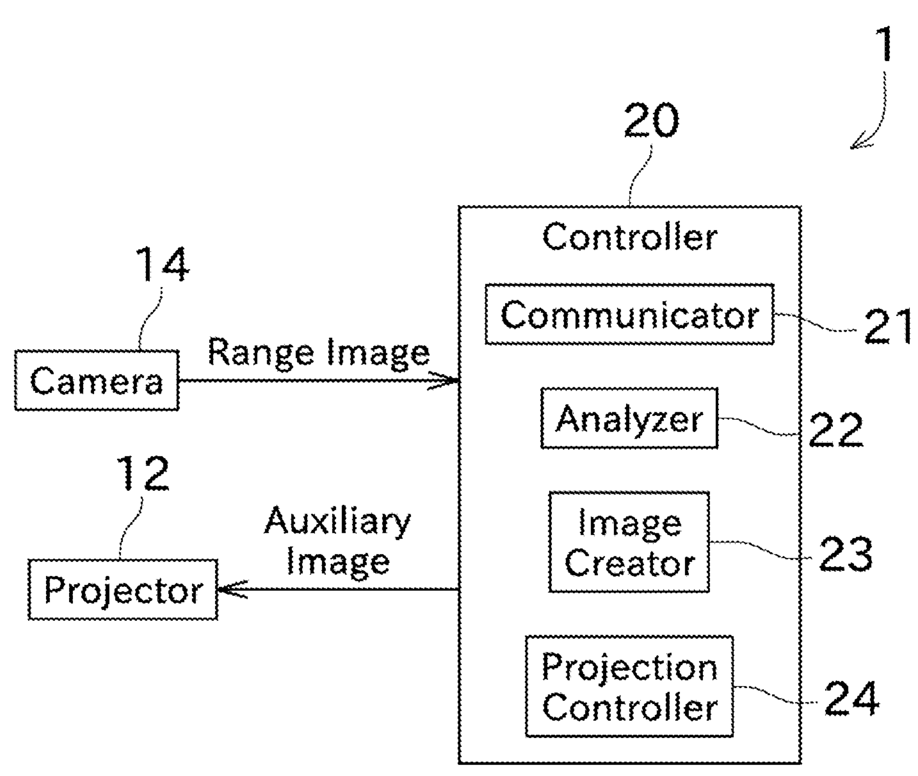
FIG. 2 is a block diagram of a work information projection system.

As shown in FIG. 1 and FIG. 2, the work information projection system 1 includes a cart 11, a projector 12, a camera mount 13, a camera 14, and a controller 20. In the following description, unless otherwise specified, the meaning of the term "position" shall include not only a location of an object, but also a direction in which the object is facing. Thus, for example, the meaning of the term "positional relation" includes not only the relative positions of two objects, but also their relative orientations.

The cart 11 includes wheels and a base. The cart 11 of the present embodiment does not include a drive source and moves in the workplace by being pushed by the worker. The cart 11 may include a drive source and be capable of autonomous travel. The projector 12, the camera mount 13, the camera 14, and the like are placed on the base. The cart 11 may be movable along a rail arranged on the floor, ceiling, or the like. The cart 11 is not an essential component and may be omitted.

The projector 12 is placed on the cart 11. The projector 12 projects the auxiliary image 101 under the control by the controller 20.

The camera mount 13 is arranged on the top face of the projector 12. The camera 14 can be attached to the camera mount 13. This prevents changes in the relative positions of the projector 12 and the camera 14. In other words, the projector 12 and the camera 14 move integrally. The arrangement method of the projector 12 and the camera 14 may be different from the present embodiment as long as the relative positions of the projector 12 and the camera 14 do not change. For example, a projector mount and a camera mount may be formed on the cart 11. Alternatively, a projector mount and a camera mount may be formed on a supporting member attached to the cart 11.

The camera 14 is a stereo camera that includes two imaging elements and they capture the workplace individually. The two imaging elements are arranged in an appropriate distance. These imaging elements are, for example, CCDs (Charge Coupled Devices). The two imaging elements operate in synchronization with each other and create a pair of image data by capturing the workplace at the same time. In the present embodiment, since it is supposed that information detected in real time is projected as an auxiliary image, it is preferable that the camera 14 captures an image for more than one time per, for example, second.

Furthermore, the camera 14 includes an image processor that processes this pair of image data. The image processor performs a known stereo matching process on the pair of image data obtained by the camera 14 to determine a distance between the positions that the two images correspond to (a disparity). The disparity increases in inverse proportion to the distance to the object captured in the image as the distance becomes shorter. The image processor creates a range image in which each pixel of the image data is linked to information about the distance based on this disparity.

The camera 14 has a configuration in which two imaging elements are arranged within one housing. Alternatively, two separate cameras may be combined to form the camera 14. Further, the image processor may be arranged in an apparatus other than the camera 14 (for example, the controller 20 as described below).

The controller 20 is a computer that includes a CPU, a ROM, a RAM, and the like. The controller 20 of the present embodiment is arranged at the cart 11. The controller 20 can communicate with the projector 12 and the camera 14 via signal lines that are not shown in the drawings. The controller 20 may be arranged outside the cart 11. In this case, the controller 20 communicates with the projector 12 and the camera 14 wirelessly, for example.

The controller 20 creates the auxiliary image 101 based on the range image received from the camera 14 and other information and transmits the auxiliary image 101 to the projector 12. As shown in FIG. 1, the controller 20 includes a communicator 21, an analyzer 22, an image creator 23, and a projection controller 24. Each part that the controller 20 includes is a conceptually divided part of the controller 20 for each process performed by the controller 20 (for each function the controller 20 has). Although the controller 20 of the present embodiment is realized by one computer, the controller 20 may be configured with more than one computer. In this case, these computers are connected via a network.

The communicator 21 is a communication module for communicating with the projector 12 and the camera 14 and includes, for example, a connector for connecting the signal line, an antenna for wireless communication, or the like. The communicator 21 receives the image captured by the camera 14 and transmits the auxiliary image 101 created by the image creator 23 to the projector 12.

The analyzer 22 performs a SLAM (Simultaneous Localization and Mapping) process on the range image captured by the camera 14. The analyzer 22 analyzes the range image to create map information (environmental map) that indicates shapes and positions of objects in the workplace and to estimate the position of the camera 14. The objects in the workplace are, for example, a facility, an apparatus, a tool, or the workpiece 31 arranged in the workplace.

Since the SLAM process is well known, it will be briefly described below. That is, the analyzer 22 analyzes the range image, sets an appropriate feature point, and acquires the movement thereof. Then, the analyzer 22 extracts and tracks more than one feature point in the range image to obtain data that expresses the movements of the feature points in a plane that corresponds to the image using vectors. The analyzer 22 creates map information based on this data. As described above, the map information is data that indicates shapes and positions of objects in the workplace, and more specifically, it is data that indicates three-dimensional positions of the extracted feature points (point cloud). Based on a change in the positions and the distances of the input feature points and the positions of the feature points in the map information, the analyzer 22 estimates a change in the position of the camera 14. The camera 14 may be a monocular camera that includes a single imaging element. The SLAM process as described above may also be performed using an image captured by the monocular camera.

The image creator 23 creates the auxiliary image 101. The controller 20 stores work information which is information about the work. The work information of the present embodiment is the names of the parts to be attached to the workpiece 31 and the positions where to attach the parts. The image creator 23 creates the auxiliary image 101 to be projected by the projector 12 based on the work information and the position of the projector 12. The position of the projector 12 is estimated based on the position of the camera 14 estimated by the analyzer 22 and the relative information that indicates the positional relation between the projector 12 and the camera 14. Since the projector 12 and the camera 14 are so fixed that they do not move relative to each other, the relative information do not change.

The projection controller 24 transmits the auxiliary image 101 created by the image creator 23 to the projector 12 to project the auxiliary image 101. With these configurations described above, the auxiliary image 101 can be projected onto the workplace.

Figure 3:
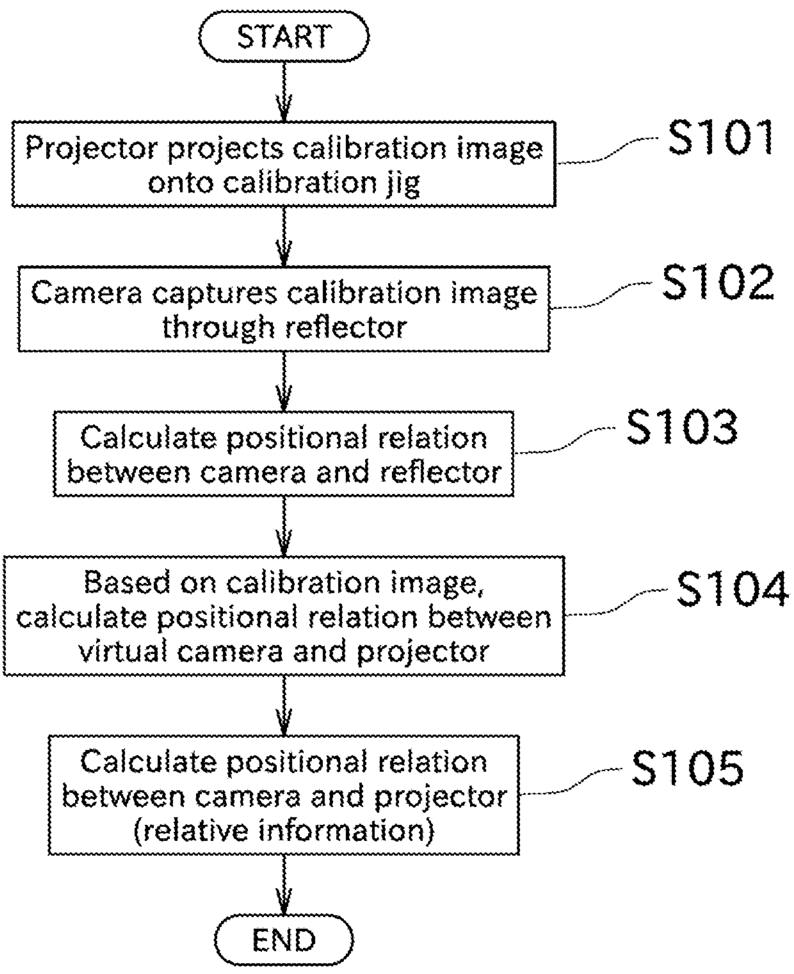
FIG. 3 is a flowchart of a calibration process.
Figure 4:
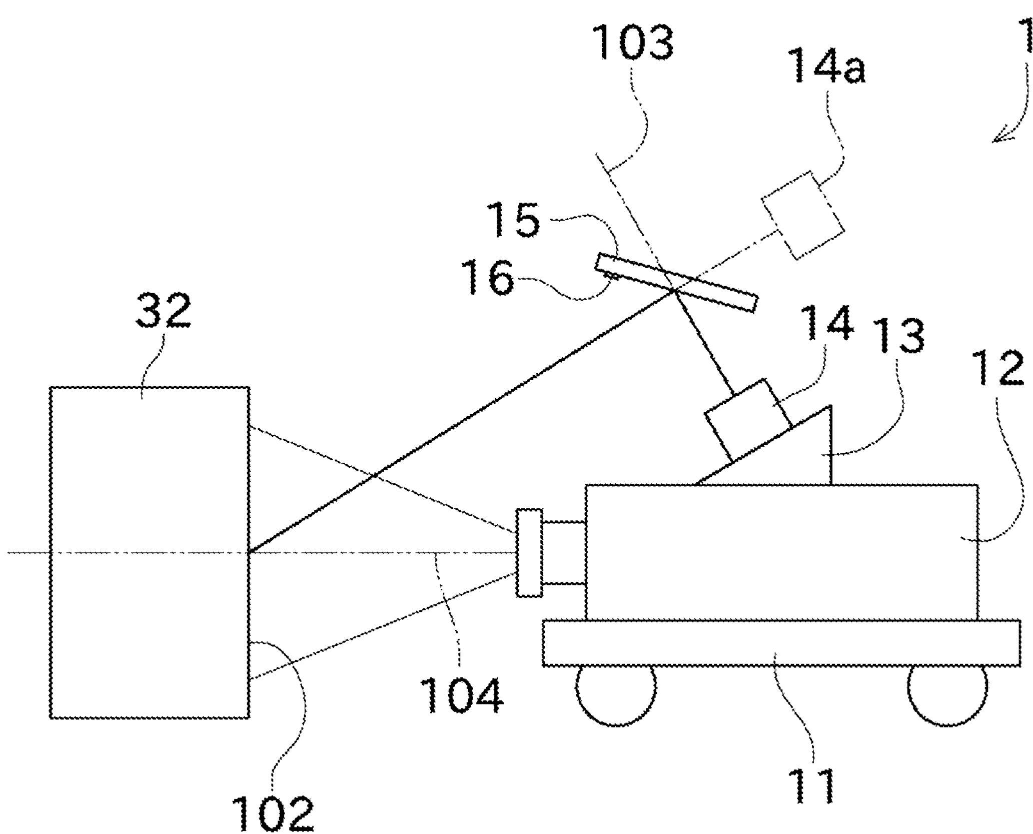
FIG. 4 is a side view illustrating a calibration process being performed using a reflector.

Then, the calibration process of calibrating the relative information will be described below with reference to FIG. 3 and FIG. 4.

First, the camera 14 is attached to the camera mount 13. This prevents the positional relation between the projector 12 and the camera 14 from changing. When the camera 14 is attached to the camera mount 13, the direction of an optical axis 103 of the camera 14 is significantly different from the direction of an optical axis (projection axis) 104 of the projector 12. The optical axis is a straight line extending in an axial direction from a point that passes an optical element (an imaging element, a light emitting element). In the present embodiment, the optical axis 103 of the camera 14 passes outside the range in which the projector 12 can project projection light. The optical axis 104 of the projector 12 is parallel to a horizontal direction, while the optical axis 103 of the camera 14 extends upward with respect to a horizontal plane. The horizontal plane is a plane perpendicular to a vertical direction. The optical axis 103 of the camera 14 may extend downward with respect to a horizontal plane. The difference in the elevation angles of the optical axis 103 of the camera 14 and the optical axis 104 of the projector 12 is, for example, 20 degrees or more, 30 degrees or more, or 45 degrees or more.

Since the direction of the optical axis 103 of the camera 14 is significantly different form the direction of the optical axis 104 of the projector 12, the camera 14 cannot directly capture the image projected by the projector 12. Therefore, in the present embodiment, a reflector 15 for the calibration is arranged to cover the optical axis 103 of the camera 14. The reflector 15 is a member that specularly reflects visible light, specifically, it is a mirror or a prism. Arranging the reflector 15 allows the camera 14 to capture the image projected by the projector 12 through the reflector 15. The reflector 15 can be attached to or detached from a component (for example, the cart 11) of the work information projection system 1. In the present embodiment, the reflector 15 is arranged only during the calibration process and is removed during the work of projecting the auxiliary image 101 onto the workplace. A marker 16 is attached to the reflector 15.

Then, a calibration jig 32 for the calibration process is arranged in front of the projector 12. This completes the preparation for the calibration process.

Upon receipt of an instruction to start the calibration process, the controller 20 transmits a calibration image 102 to the projector 12. The projector 12 projects the transmitted calibration image 102 onto the calibration jig 32 (S101, first process). Then, through the reflector 15, the camera 14 captures the calibration image 102 projected onto the calibration jig 32 (S102, second process). The image captured by the camera 14 also includes the marker 16.

Then, based on the position, the size, the degree of distortion, or the like of the marker 16 included in the image captured by the camera 14, the controller 20 performs a known analysis process to calculate the relative position (that is, positional relation between the camera 14 and the reflector 15) of the marker 16 with respect to the camera 14 (S103).

Then, based on the calibration image captured by the camera 14, the controller 20 calculates the positional relation between a virtual camera 14*a* and the projector 12 (S104). The position of the virtual camera 14*a* can be calculated based on the positional relation between the camera 14 and the reflector 15. Specifically, the virtual camera 14*a* is at a position that is plane-symmetrical to the camera 14 with the reflection plane of the reflector 15 as a symmetry plane. To calculate the positional relation between the virtual camera 14*a* and the projector 12 based on the calibration image, a conventional calibration process can be used. In other words, based on the position, the size, the degree of distortion, or the like of a displayed object included in the calibration image, the positional relation between the virtual camera 14*a* and the projector 12 can be calculated.

Then, the controller 20 calculates the relative information which is the positional relation between the camera 14 and the projector 12 (S105, third process). In the step S104, the positional relation between the virtual camera 14*a* and the projector 12 has already been calculated. Furthermore, as described above, the positional relation between the camera 14 and the virtual camera 14*a* has already been calculated. Therefore, based on these two positional relations, the relative information can be calculated. This completes the calibration process.

As described above, even when the camera 14 cannot directly capture the calibration image projected by the projector 12, the calibration of the relative information which is the positional relation between the camera 14 and the projector 12 can be performed by using the reflector 15.

Next, the process performed during the work when the auxiliary image 101 is projected onto the workplace will be described below with reference to FIG. 1 and FIG. 5.

First, the issues exist in the conventional technology (PTL 1) will be described. In the conventional technology, the camera and the projector face in almost the same direction. Therefore, the camera captures the work position where the worker performs the work. However, at the work position, positions, sizes, shapes, or the like of objects change as the work progresses, so that the feature points for the SLAM process may change (that is, they are disturbances) and the accuracy of the estimation of the position of the camera may become low. As a result, the accuracy of the position at which the auxiliary image is projected by the projector becomes low. Furthermore, since the camera captures the auxiliary image projected by the projector, the auxiliary image may be determined as a feature point (that is, it may become a disturbance). If the auxiliary image is determined as a feature point, errors will be accumulated because the position at which the auxiliary image is projected is adjusted according to an error in the estimated position of the camera and the projected auxiliary image is captured by the camera and processed as a feature point. As a result, the accuracy of the position at which the auxiliary image is projected by the projector becomes significantly low.

When the size of the workpiece is large and the surface of the workpiece has few undulations (for example, the workpiece 31 shown in FIG. 1), the number of the feature points is so small that the accuracy of the estimation of the position of the camera becomes low even if the camera is arranged close to the workpiece. In this case, with the conventional technology, the distance between the camera and the workpiece should be increased. However, if the distance between the camera and the workpiece is increased, the required output of the projector increases so that the cost increases.

In contrast, in the present embodiment, the accuracy of the position at which the auxiliary image 101 is projected by the projector 12 is higher and the position of the camera 14 is less restricted than in the conventional technology. The specifics thereof are explained below.

First, the analyzer 22 of the controller 20 performs the processes described above on the image captured by the camera 14 to estimate the positions of the origin and the camera 14 in the workplace (S201). The position of the camera 14 in the workplace is the position of the camera 14 in the coordinate system of the environmental map created with respect to the workplace (the same applies to the projector 12 and the workpiece 31). In the following description, the position of the camera 14 or the like in the workplace may be referred to simply as the position of the camera 14.

Since the direction that the camera 14 of the present embodiment faces in is significantly different form the direction that the projector 12 faces in, the camera 14 does not capture the auxiliary image 101. The camera 14 captures a ceiling member 33 which is, for example, a beam or a lighting apparatus arranged on the ceiling. Since a change of, for example, the position of an object with respect to the ceiling member 33 is less likely to occur in contrast to the work position, the accuracy of the estimation of the self-position of the camera 14 is higher than the conventional technology. Even if the camera 14 is arranged near the workpiece 31, the camera 14 captures the ceiling member 33, not the workpiece 31. Therefore, the position of the camera 14 is less restricted. The camera 14 may capture a wall, a shelf, a machine, or the like instead of or in addition to the ceiling member 33.

Then, the analyzer 22 of the controller 20 estimates the position of the projector 12 in the workplace based on the position of the camera 14 in the workplace estimated in step S201 and the relative information obtained by the calibration process (S202).

Then, the image creator 23 of the controller 20 creates the auxiliary image 101 based on the position of the projector 12 with respect to the position of the workpiece 31 in the workplace (S203). Since the positional relation between the workpiece 31 and the projector 12 is known, how an image is displayed on the workpiece 31 when the image is projected by the projector 12 can be obtained by calculation. Therefore, the image creator 23 can create the auxiliary image 101 that can be projected onto a predetermined position on the workpiece 31 (position where a part should be attached) at a predetermined size (the same size as the actual size of the part).

Then, the projection controller 24 of the controller 20 transmits the auxiliary image 101 created in step S203 to the projector 12 and instruct it to project the auxiliary image 101 (S204).

Figure 5:
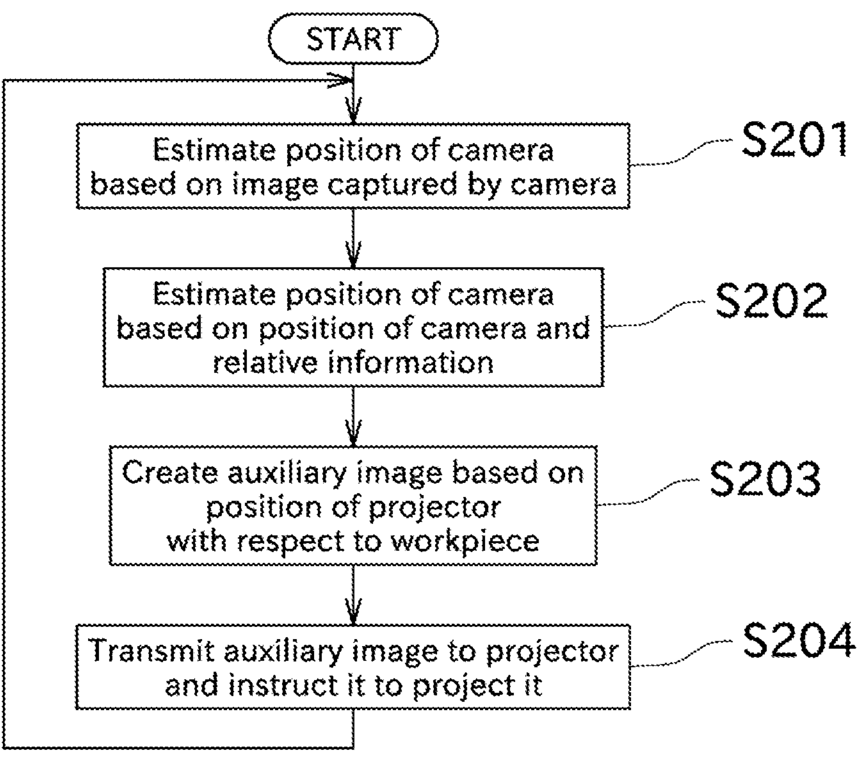
FIG. 5 is a flowchart of processes performed during a work.

The controller 20 repeats the process shown in FIG. 5. Therefore, even when the cart 11 moves, the auxiliary image 101 projected onto the workpiece 31 does not change because the auxiliary image 101 is created with the size and the position corresponding to the position after the movement.

When the work shown by the auxiliary image 101 is completed, the worker reports it to the controller 20 using an information terminal or the like. In response, the controller 20 creates the auxiliary image 101 for the next work and project it. In addition to the camera 14, a monocular camera or a camera may be arranged to capture the work position and the controller 20 may determine whether the work is completed based on the image captured by them.

Figure 6:
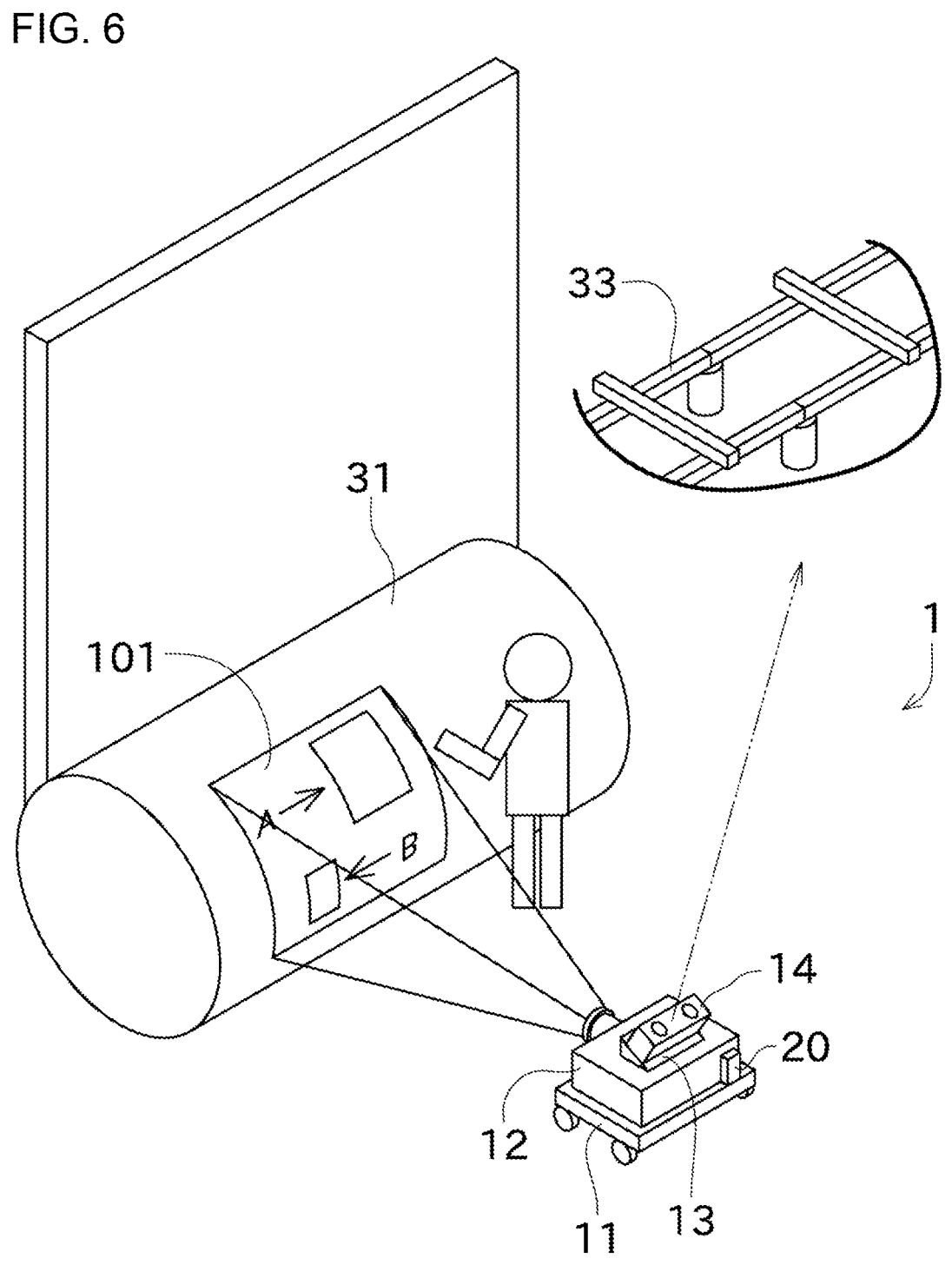

Next, a first modification of the above embodiment will be described with reference to FIG. 6. FIG. 6 is a schematic drawing of a work information projection system 1 according to the first modification. In the descriptions of the first modification and subsequent modifications, the components identical or similar to those of the above-described embodiment may be marked with the same reference signs in the drawings and the description thereof may be omitted.

In the above-described embodiment, when the direction in which the projector 12 projects the auxiliary image 101 is defined as forward, the optical axis of the camera 14 includes a forward direction as a component. In contrast, in the first modification, the optical axis of the camera 14 does not include a forward direction as a component (it includes a backward direction as a component). This allows high accuracy of the estimation of the position of the camera 14 even in an environment where few feature points exist in front and above (for example, an environment where an only flat wall is arranged).

Figure 7:
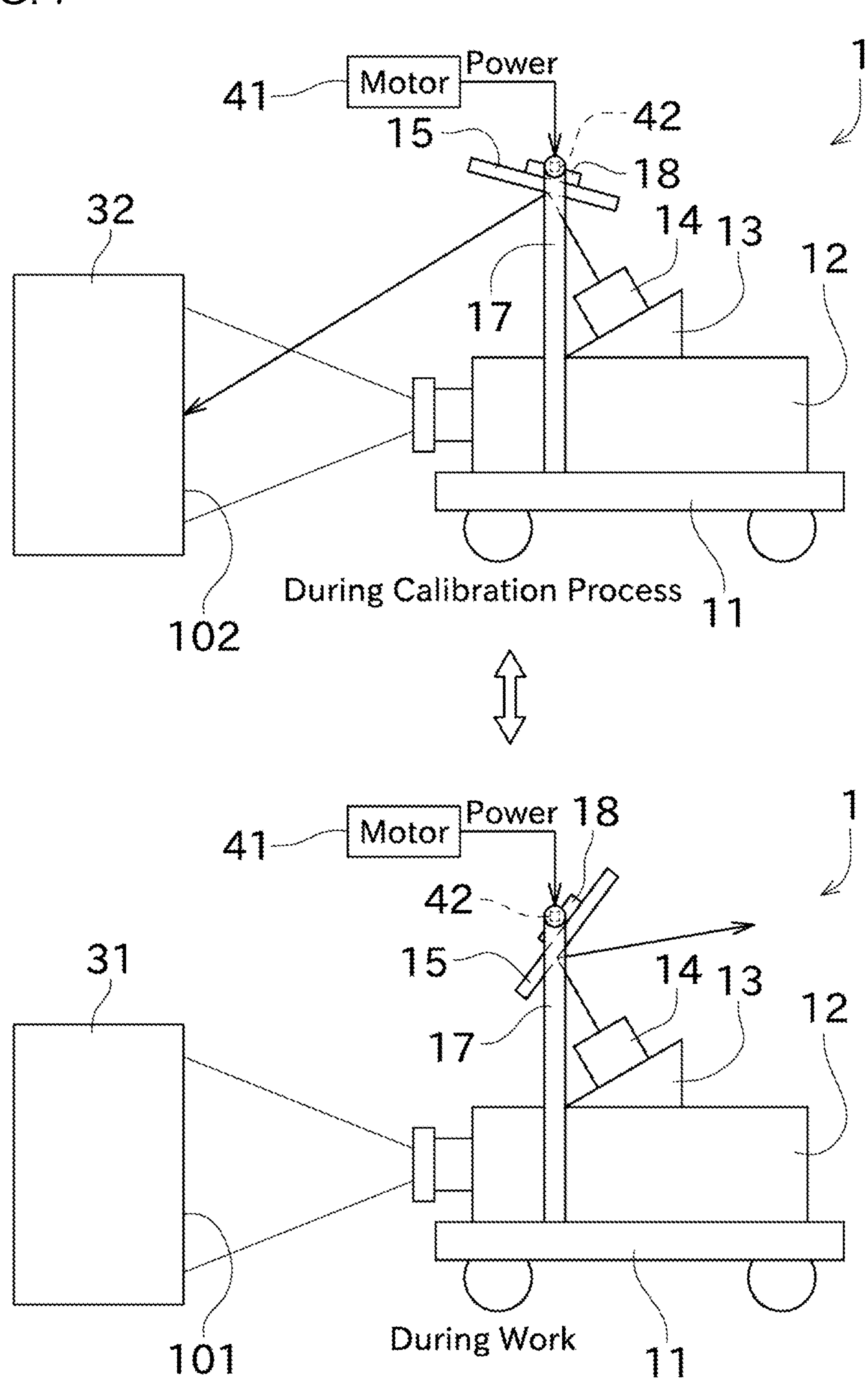
FIG. 7 is a drawing comparing configuration of a work information projection system according to a second modification during a calibration process and during a work.
Figure 8:
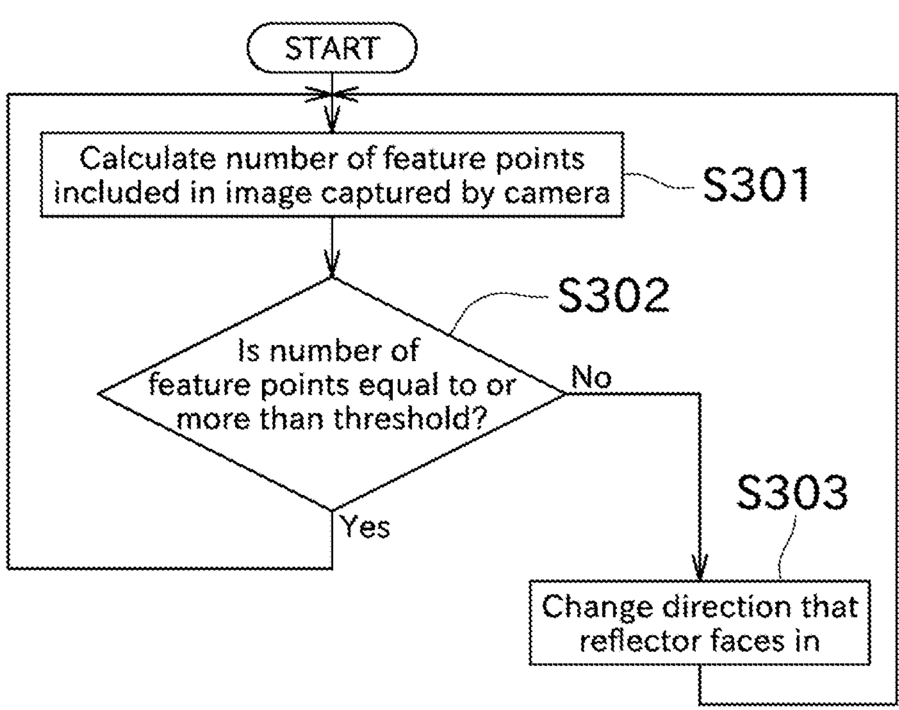
FIG. 8 is a flowchart during a work according to a second modification.

Next, a second modification will be described with reference to FIG. 7 and FIG. 8. FIG. 7 is a drawing that compares the configuration of a work information projection system 1 according to the second modification during a calibration process and during a work. FIG. 8 is a flowchart during the work according to the second modification.

In the above-described embodiment, the reflector 15 is used during the calibration process and the reflector 15 is removed when performing the work. In contrast, in the second modification, the reflector 15 is used not only during the calibration process but also during the work. Specifically, as shown in FIG. 7, the work information projection system 1 includes a frame 17, a mount 18, a motor (driver) 41, and an encoder (detector) 42.

The frame 17 is a gantry-shaped (substantially U-shaped) frame and is shaped so as not to interfere with the camera 14 capturing image. The mount 18 is attached to the frame 17 in a way that it can relatively rotate. The reflector 15 is fixed to the mount 18. In other words, the mount 18 and the reflector 15 integrally rotate.

The motor 41 is a motor wherein the amount of the rotation of the output shaft is controllable (for example, a stepping motor) and is controlled by the controller 20. The motor 41 generates power to rotate the reflector 15. The power generated by the motor 41 is transmitted to the mount 18 via a transmission mechanism not shown in the drawings. With this configuration, the direction that the reflector 15 faces in can be changed. Although the rotational axis of the reflector 15 is parallel to a horizontal direction in the present embodiment, it may be not parallel to it. The encoder 42 is attached to the mount 18 and detects the rotation angle of the mount 18 (that is, the direction that the reflector 15 faces in).

With the above configuration, the direction that the reflector 15 faces in can be changed according to the amount of the rotation instructed by the controller 20. Since the reflector 15 is arranged to cover the optical axis 103 of the camera 14, the position to be captured by the camera 14 can be changed by changing the direction that the reflector 15 faces in.

A drawing described as "During Calibration Process" in FIG. 7 shows the direction that the reflector 15 faces in during the calibration process (a first direction). During the calibration process, the direction in which the reflector 15 faces is so controlled that the camera 14 can capture the calibration image 102.

A drawing described as "During Work" in FIG. 7 shows the direction that the reflector 15 faces in during the work (a second direction). As described above, when the camera 14 captures the auxiliary 101 during the work, the auxiliary image 101 becomes a disturbance. Therefore, during the work, the direction in which the reflector 15 faces is so controlled that the camera 14 captures the position that does not include the auxiliary image 101.

In the configuration of the second modification, there is no need to attach and remove the reflector 15 during the calibration process and the work. Therefore, the time and effort required for switching between the calibration process and the work can be reduced.

The controller 20 of the second modification performs the process shown in FIG. 8 during the work in order to maintain the accuracy of the estimation of the position of the camera 14 in the workplace high.

The controller 20 calculates the number of feature points included in the image captured by the camera 14 (S301). Then, the controller 20 determines whether the number of the feature points calculated in step S301 is equal to or exceeds a threshold (S302). In a case where the number of the feature points is too small, the position of the camera 14 may not be accurately estimated.

If the controller 20 determines that the number of the feature points is less than the threshold, it changes the direction in which the reflector 15 faces by controlling the motor 41 (S303). For example, to change the direction that the reflector 15 faces in by N degrees, the controller 20 rotates the output shaft of the motor 41 until the value detected by the encoder 42 changes by N degrees.

Changing the direction the reflector 15 faces in changes the position that the camera 14 captures. Then, the controller 20 again performs the processes in step S301 and S302. If the number of the feature points included in the image captured by the camera 14 becomes equal to or exceeds the threshold, the controller 20 does not perform the process of changing the direction the reflector 15 faces in. In other words, the controller 20 continues to change the direction the reflector 15 faces in until the number of the feature points included in the image captured by the camera 14 becomes equal to or exceeds the threshold.

In this manner, even when the camera captures the position with few feature points (for example, a flat wall), changing the direction the reflector 15 faces in allows the camera 14 to capture another position with many feature points. Therefore, this maintains high accuracy of the estimation of the position of the camera 14. In addition, it is not preferable that the camera 14 captures the auxiliary image 101, the cart 11, or the like during the work. Therefore, it is preferable to set a maximum limit and a minimum limit for the range of changing the direction that the reflector 15 faces in.

As the direction that the reflector 15 faces in changes, the image captured by the camera 14 changes. Therefore, in order to update the map information that has already been created, it is necessary to identify which direction in the coordinate system of the environmental map the image captured by the camera 14 through the reflector 15 was captured from. In this regard, in the present embodiment, the accurate direction that the reflector 15 faces in is detected by the encoder 42. Therefore, even if the direction that the reflector 15 face in is changed, the position of the camera 14 can be estimated and the existing map information can be updated by using the amount of change in the direction that the reflector 15 faces in (a value that indicates how much it changed from a reference direction) and the existing map information.

As described above, the work information projection system 1 of the above-described embodiment includes the projector 12, the camera 14, and the controller 20. The projector 12 projects the auxiliary image 101 that assists the work onto the workplace. The camera 14 captures the workplace. The controller 20 creates the auxiliary image 101 and transmits it to the projector 12. During the calibration process of calibrating the relative information that indicates the relative positional relation between the camera 14 and the projector 12, the camera 14 captures the calibration image 102 projected by the projector 12 onto the calibration jig 32 through the reflector 15. The controller 20 performs the calibration process of calibrating the relative information based on the calibration image 102 captured by the camera 14.

Performing the calibration process using the reflector 15 allows the camera 14 to be pointed in a direction significantly different from the direction that the projector 12 faces in. Therefore, capturing a position where no work is being performed, for example, makes a disturbance less likely to occur in the image captured by the camera 14 so that the accuracy of the detection of the position of the camera 14 becomes high. As a result, the projector 12 can project the auxiliary image at an accurate position.

In the work information projection system 1 of the above-described embodiment, during the work when the auxiliary image 101 is projected onto the workplace, the controller 20 estimates the position of the camera 14 based on the image captured by the camera 14. The controller 20 estimates the position of the projector 12 based on the relative information and the position of the camera 14. The controller 20 controls the projector 12 based on the positon of the projector 12 to project the auxiliary image 101 onto the workplace.

This allows the auxiliary image to be projected at an accurate position during the work.

In the work information projection system 1 of the above-described embodiment, the camera 14 is so arranged that it moves integrally with the projector 12.

This allows the accurate position of the projector 12 to be calculated and the auxiliary image because the positional relation between the camera 14 and the projector 12 does not change, and thus the auxiliary image can be projected at an accurate position.

In the work information projection system 1 of the above-described embodiment, during the work, the direction of the optical axis 103 of the camera 14 is different from the direction of the optical axis 104 of the projector 12.

Furthermore, in the work information projection system 1 of the above-described embodiment, during the work, the optical axis 103 of the camera 14 is not included in the range in which the projector 12 can project the projection light.

This make a disturbance even less likely to occur in the image captured by the camera 14 because the directions that the camera 14 faces in and the projector 12 faces in are significantly different.

In the work information projection system 1 of the above-described embodiment, the direction that the reflector 15 faces in is changeable.

This allows the direction that the reflector 15 faces in to be changed as needed.

In the work information projection system 1 of the above-described embodiment, the direction that the reflector 15 faces in is changeable between the first direction with which the camera 14 can capture the calibration image 102 projected by the projector 12 and the second direction with which the camera 14 cannot capture the auxiliary image 101 projected by the projector 12.

This allows the camera 14 to capture the calibration image 102 projected by the projector 12 during the calibration process. This also makes a disturbance even less likely to occur because the camera 14 does not capture the auxiliary image 101 projected by the projector 12 during the work.

The work information projection system 1 of the above-described embodiment includes the motor 41 that generates power to change the direction that the reflector 15 faces in. During the work, the camera 14 captures an image through the reflector 15. The controller 20 changes the direction that the reflector 15 faces in by controlling the motor 41 when it determines that the number of the feature points included in the image captured by the camera 14 becomes less than the threshold.

This allows the camera 14 to capture the position that includes many feature points, so that the position of the camera 14 can be estimated even more accurately.

In the work information projection system 1 of the above-described embodiment, the camera 14 captures the calibration image 102 through the reflector 15 during the calibration process. The camera 14 captures the workplace without the reflector 15 during the work.

This allows a configuration in which the camera 14 captures the image projected by the projector 12 during the calibration process, meanwhile the camera 14 does not capture the image projected by the projector 12 during the work.

In the work information projection system 1 of the above-described embodiment, during the calibration process, the controller 20 calculates the positional relation between the camera 14 and the reflector 15 based on the reflector 15 included in the image captured by the camera 14. The controller 20 calculates the positional relation between the camera 14 and the virtual camera **14*a* based on the positional relation between the camera 14 and the reflector 15. The controller 20 calculates the positional relation between the projector 12 and the virtual camera 14*a* based on the calibration image 102 reflected in the reflector 15** and calibrates the relative information.

This allows the appropriate calibration of the relative information.

In the work information projection system 1 of the above-described embodiment, the optical axis 103 of the camera 14 is upward with respect to a plane perpendicular to a vertical direction.

This allows the upper position where a disturbance is relatively less likely to occur to be captured. The optical axis of the camera 14 may also be downward with respect to a plane perpendicular to a vertical direction.

Although the preferred embodiment and the modifications of the present invention has been described above, the above-described configurations can be modified, for example, as follows.

The flowcharts shown in the above-described embodiment are disclosed just as examples and some processes may be omitted, the contents of some processes may be changed, or new processes may be added. For example, in the flowchart shown in FIG. 3, the positional relation between the camera 14 and the reflector 15 may be firstly calculated and the calibration may be projected and captured after that (steps S101 and S102 may be performed after step S103).

In the above-described embodiment, the projector 12 and the camera 14 are movable by the cart 11. Alternatively, the projector 12 and the camera 14 may be configured to move together with an operator, for example, being held in the operator's hand or attached to the operator.

In the above-described embodiment, the auxiliary image 101 is projected onto the workpiece 31, but the auxiliary image may be projected onto an object other than the workpiece 31 (for example, a wall, a tool, a machine, or the like).

DESCRIPTION OF THE REFERENCE SIGNS

1 Work information projection system
11 Cart
12 Projector
14 Camera
15 Reflector
16 Marker
20 Controller

The invention claimed is:

1. A work information projection system, comprising:
- a projector that projects an auxiliary image that assists work onto a workplace;
- a camera that captures the workplace;
- a memory; and
- a controller, connected to the memory, that creates the auxiliary image and transmits it to the projector,
- wherein, during a calibration process of calibrating relative information that indicates a relative positional relation between the camera and the projector:
- the camera captures a calibration image projected by the projector onto a calibration jig through a reflector, and
- the controller performs the calibration process of calibrating the relative information based on the calibration image captured by the camera,
- wherein a direction that the reflector faces in is changeable, and
- wherein the direction that the reflector faces in is changeable between a first direction with which the camera can capture the calibration image projected by the projector and a second direction with which the camera cannot capture the auxiliary image projected by the projector.

2. The work information projection system according to claim 1, wherein, during the work when the auxiliary image is projected onto the workplace:
- the controller estimates a position of the camera based on an image captured by the camera,
- the controller estimates a position of the projector based on the relative information and the position of the camera, and the controller controls the projector based on the position of the projector to project the auxiliary image onto the workplace.

3. The work information projection system according to claim 1, wherein:

the camera moves integrally with the projector.

4. The work information projection system according to claim 1, wherein:

during the work when the auxiliary image is projected onto the workplace, a direction of an optical axis of the camera is different from a direction of an optical axis of the projector.

5. The work information projection system according to claim 4, wherein:

during the work, the optical axis of the camera is not included in a range in which the projector can project projection light.

6. The work information projection system according to claim 1, further comprising:

a driver that generates power to change the direction that the reflector faces in, wherein, during the work when the auxiliary image is projected onto the workplace;

the camera captures the workplace through the reflector, and the controller changes the direction that the reflector faces in by controlling the driver when it determines that a number of feature points included in an image captured by the camera becomes less than a threshold.

7. The work information projection system according to claim 6, wherein:

the driver is a motor including an output shaft with a controllable amount of rotation, and the work information projection system further comprises an encoder attached to a mount of the reflector to detect a rotation angle of the mount.

8. The work information projection system according to claim 1, wherein an optical axis of the camera is upward or downward with respect to a plane perpendicular to a vertical direction.

9. The work information projection system according to claim 1, wherein:

a marker is attached to the reflector, and the image captured by the camera includes the marker.

10. The work information projection system according to claim 1, further comprising:

a cart including wheels and a base, wherein the projector and the camera are placed on the base.

11. A work information projection system, comprising:

a projector that projects an auxiliary image that assists work onto a workplace;

a camera that captures the workplace;

a memory; and a controller, connected to the memory, that creates the auxiliary image and transmits it to the projector, wherein, during a calibration process of calibrating relative information that indicates a relative positional relation between the camera and the projector;

the camera captures a calibration image projected by the projector onto a calibration jig through a reflector, and the controller performs the calibration process of calibrating the relative information based on the calibration image captured by the camera, wherein:

the camera captures the calibration image through the reflector during the calibration process, and the camera captures the workplace without the reflector during the work when the auxiliary image is projected onto the workplace.

12. The work information projection system according to claim 11, wherein during the work when the auxiliary image is projected onto the workplace:

the controller estimates a position of the camera based on an image captured by the camera, the controller estimates a position of the projector based on the relative information and the position of the camera, and the controller controls the projector based on the position of the projector to project the auxiliary image onto the workplace.

13. The work information projection system according to claim 11, wherein:

the camera moves integrally with the projector.

14. The work information projection system according to claim 11, wherein:

during the work when the auxiliary image is projected onto the workplace, a direction of an optical axis of the camera is different from a direction of an optical axis of the projector.

15. The work information projection system according to claim 14, wherein:

during the work, the optical axis of the camera is not included in a range in which the projector can project projection light.

16. A work information projection system, comprising:

a projector that projects an auxiliary image that assists work onto a workplace;

a camera that captures the workplace;

a memory; and a controller, connected to the memory, that creates the auxiliary image and transmits it to the projector, wherein, during a calibration process of calibrating relative information that indicates a relative positional relation between the camera and the projector;

the camera captures a calibration image projected by the projector onto a calibration jig through a reflector, and the controller performs the calibration process of calibrating the relative information based on the calibration image captured by the camera, wherein, during the calibration process:

the controller calculates a positional relation between the camera and the reflector based on the reflector included in an image captured by the camera, the controller calculates a positional relation between the camera and a virtual camera based on the positional relation between the camera and the reflector, and the controller calculates a positional relation between the projector and the virtual camera based on the calibration image reflected in the reflector and calibrates the relative information.

17. The work information projection system according to claim 16, wherein during the work when the auxiliary image is projected onto the workplace:

the controller estimates a position of the camera based on the image captured by the camera, the controller estimates a position of the projector based on the relative information and the position of the camera, and the controller controls the projector based on the position of the projector to project the auxiliary image onto the workplace.

18. The work information projection system according to claim 16, wherein:

the camera moves integrally with the projector.

19. The work information projection system according to claim 16, wherein:

during the work when the auxiliary image is projected onto the workplace, a direction of an optical axis of the camera is different from a direction of an optical axis of the projector.

20. The work information projection system according to claim 16, wherein:

an optical axis of the camera is upward or downward with respect to a plane perpendicular to a vertical direction.

* * * * *